(12) United States Patent
Lee et al.

(10) Patent No.: US 6,449,224 B1
(45) Date of Patent: Sep. 10, 2002

(54) INSTALLATION ANGLE ADJUSTMENT OF THE SPINDLE MOTOR IN AN OPTICAL DISK PLAYER

(75) Inventors: Wei-Pang Lee; Shi-Wei Liu, both of Taipei (TW)

(73) Assignee: Asustek Computer Inc., Taipei (TW)

( * ) Notice: Subject to any disclaimer, the term of this patent is extended or adjusted under 35 U.S.C. 154(b) by 0 days.

(21) Appl. No.: 09/397,377

(22) Filed: Aug. 20, 1999

(30) Foreign Application Priority Data

Jan. 25, 1999 (TW) .......................................... 88101046

(51) Int. Cl.⁷ ................................................ G11B 7/09
(52) U.S. Cl. ................................ 369/44.14; 369/44.32; 369/53.19
(58) Field of Search ........................ 369/44.11, 44.12, 369/44.14, 44.23, 44.28, 44.29, 44.32, 44.34, 47.1, 53.1, 53.11, 53.12, 53.14, 53.19, 53.41

(56) References Cited

U.S. PATENT DOCUMENTS 6,160,772 A * 12/2000 Muramatsu ............... 369/44.11

FOREIGN PATENT DOCUMENTS

| JP | 08279256 A | 10/1996 |
|----|------------|---------|
| JP | 09106618 A | 4/1997 |
| JP | 3045330 | 11/1997 |
| JP | 11120568 A | 4/1999 |

* cited by examiner

*Primary Examiner*—Muhammad Edun
(74) *Attorney, Agent, or Firm*—Rabin & Berdo, P.C.

(57) ABSTRACT

A micro-adjustment apparatus for the spindle motor installation angle in an optical disk player is provided. The optical disk player includes a traverse, and the traverse includes a pickup, a first guide rail, and a framework. The pickup includes a light source for supplying a light beam, and the first guide rail guides the pickup during data reproduction. A spin surface is defined while the spindle is spinning. The micro-adjustment apparatus includes a supporting plate, a pivotal device, a first adjustable pivotal device, and a second adjustable pivotal device. The supporting plate supports the spindle motor and is adjustably coupled to the framework. The pivotal device is disposed at a first predetermined location on the supporting plate and contacts the first guide rail. The first adjustable pivotal device is disposed at a second predetermined location on the supporting plate for adjusting an elevation angle of the supporting plate such that the light beam is substantially vertical to the spin surface. The second adjustable pivotal device is disposed at a third predetermined location on the supporting plate for adjusting an incline angle of the supporting plate such that the light beam is substantially vertical to the spin surface.

15 Claims, 6 Drawing Sheets

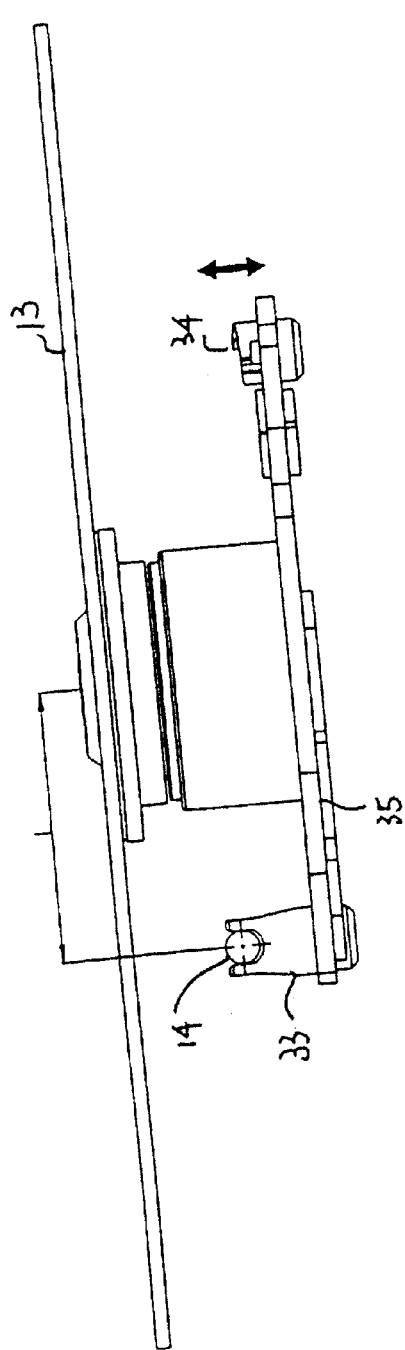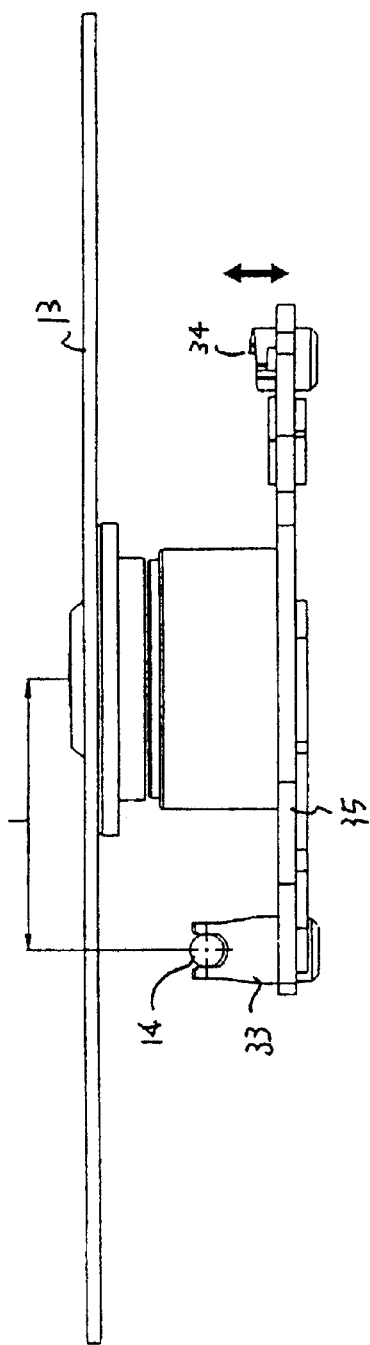
FIG. 4(B)
FIG. 4(A)

INSTALLATION ANGLE ADJUSTMENT OF THE SPINDLE MOTOR IN AN OPTICAL DISK PLAYER

FIELD OF INVENTION

The present invention relates to a micro-adjustment mechanism for adjusting installation angle of the spindle motor in an optical disk player, i.e. CD-ROM, CD-player, CD-R, CD-RW, DVD-ROM and DVD-player.

BACKGROUND OF INVENTION

The following technical information may be further referred to in order to have an in-depth understanding of the background and prior art technology regarding the invention.

1. International Standard ISO/IEC 10149, first edition, 1989-09-01, Global Engineering Documents, Irvine, Calif. 92714, USA.
2. Small Form Factor Committee, Specification of ATA Packet Interface for CD-ROM's, SFF-8020, Revision 1.2, Feb. 24, 1994.
3. SCSI-2 draft proposed American National Standard, Revision 10c.
4. Red book, Compact Disc-Digital Audio(CD-DA), by Sony Corp. and Philips N. V., April 1987.
5. Yellow book, Compact Disc-Read Only Memory (CD-ROM), by Sony Corp. and Philips N. V., Nov. 1988.

It is well known that there are multiple distinctive servo loops employed in a disk player to reproduce data by guiding the laser beam over the data track through track-search, in-track-following, and focus operations. The prior art servo control system for the optical disk player includes U.S. Pat. Nos. 4,485,337, 4,783,774, 5,289,097, 5,246,479, 5,257, 252, 5,345,347, 5,808,978, 5,751,680, 5,796,707 and 5,001, 690.

The Red Book mentioned above requires the pitch of disk data tracks to be 1.6 μm and 0.74 μm respectively for CD-ROM and DVD. The in-track-following error of the optical pickup must be within 0.1 μm for CD-ROM and within 0.022 μm for DVD to assure a normal data read/write operation. As an example, for a disk with a diameter of 120 mm, the allowable traverse distance for the pickup during data access operation is 3.5 cm. In order to achieve the long distance movement and precision positioning requirements for the pickup, typical pickup is controlled by a dual-actuator system. That is, one in-track-following actuator is responsible for in-track-following operation, which is in nature of high frequency and short distance movement, and another actuator is responsible for search track operation which is in nature of low frequency and long distance movement. Furthermore, the allowable eccentricity is +200 μm and −200 μm for CD-ROM, and +100 μm and −100 μm for DVD. Despite the operation speed, the servo control for the in-track-following operation must always overcome the existing eccentricity of the disk and/or the physical damage over the surface and, at the same time, keep the in-track-following error within the allowable range (0.1 μm). Theoretically, to accurately reproduce the data on the track, the laser beam radiating from the source must be incident upon the surface of the disk vertically. If there is a minor incident angle error, one denotes it as the optical axis tilt angle. As the track data density and spin speed of the player, e.g. DVD, increase substantially, the existence of the tilt angle would affect the quality and reliability of data reproduction.

As shown in FIG. 1, the optical disk player includes a pickup traverse 10 connected to the loading module (not shown) through four positioning screws (not shown), and is tiltable with respect to the loading module. On the traverse 10, there is provided a spindle 16, which spins in high speed when operated, a turntable 18 and a pickup 12, which is capable of making rectilinear reciprocal movement.

During rectilinear reciprocal movement of the pickup 12, the first guide rail 14 supports and guides the pickup 12. The second guide rail 15 is responsible for the supporting in the horizontal direction to prevent the falling of pickup 12 with respect to axis of the first guide rail 14. During the data reproduction operation of pickup 12, the supporting function of the first guide rail 14 and the second guide rail 15 defines an optical pickup surface along which the pickup 12 moves. The disk 13 sits on the turntable 18 and spins accordingly. During rotation of the disk 13, it defines a spin surface. In theory, to achieve a best data reproduction result, the spin surface should parallel the optical pickup surface. As such, the light beam from the pickup 12 may then be vertically incident to the disk surface and makes the incline angle to be ideally zero regardless of which data track is selected.

Referring to FIG. 2, the optical pickup 12 is movably supported on a feeder 21. The feeder 21 is driven by the actuator 11 in a well-known manner so that optical pickup 12 moves radially in reference to the surface of the optical disk 13. The optical pickup 12 includes a carriage 121, a source of a light beam, e.g., a semiconductor laser device 122, a collimator lens 123, a semi-transparent mirror 124, a device for placing a laser beam on the optical disk 13, e.g., an objective lens 125, a split photosensor 126, an in-track-following actuator 127 and a focusing actuator 128. The laser device 122 radiates the laser beam. The collimator lens 123, the semi-transparent mirror 124 and the objective lens 125 guide the laser beam to the optical disk 13 so that the laser beam is placed on the optical disk 13 in a form of light spot. The optical pickup 12 then scans concentric tracks of the optical disk 13 one after another or a spiral track of the optical disk 13 with the light spot of the laser beam moving in radial direction during the disk information reproduction operation. The laser beam is reflected by the optical disk 13 and then applied to the split photosensor 126 through the objective lens 125 and the semi-transparent mirror 124. The split photosensor 126 detects from the reflected laser beam information data responding to a state, e.g., a strength of the reflected laser beam, and produces an electrical signal responding to the information. The objective lens 125 is movably mounted on the carriage 121 of the optical pickup 12. The in-track-following actuator 127 controls position of objective lens 125 in the radial direction of the disk 13 so that the light spot of the laser beam follows a center of a prescribed track. The tracking control of the objective lens 125 may be made by a conventional tracking control system. The focusing actuator 128 controls the position of objective lens 125 in the perpendicular direction to the surface of the optical disk 13 so that the light spot of the laser beam is accurately focused on a prescribed track. The focusing control of the objective lens 125 may be made by a conventional focusing control system.

SUMMARY OF INVENTION

Based on the requirement mentioned above, the main objective of the invention is to reduce the incline or elevation angle of the optical axis of the pickup to substantial zero and therefore obtain a reliable high speed data reproduction.

A micro-adjustment apparatus for the spindle motor installation angle in an optical disk player is provided. The optical disk player includes a traverse, and the traverse includes a pickup, a first guide rail, and a framework. The pickup includes a light source for supplying a light beam, and the first guide rail guiding the pickup during data reproduction. A spin surface is defined while the spindle is spinning.

The micro-adjustment apparatus includes a supporting plate, a pivotal device, a first adjustable pivotal device, and a second adjustable pivotal device.

The supporting plate supports the spindle motor and is adjustably coupled to the framework.

The pivotal device is disposed at a first predetermined location on the supporting plate and contacts with the first guide rail.

The first adjustable pivotal device is disposed at a second predetermined location on the supporting plate for adjusting an elevation angle of the supporting plate such that the light beam is substantially vertical to the spin surface.

The second adjustable pivotal device is disposed at a third predetermined location on the supporting plate for adjusting an incline angle of the supporting plate such that the light beam is substantially vertical to the spin surface.

BRIEF DESCRIPTIONS OF APPENDED DRAWINGS

FIG. 1 discloses the internal structure of an optical disk player according to the invention.

FIG. 4(A) and FIG. 4(B) together show the result and benefit of the invention when the micro-adjustment operation is performed.

Figure 5A:
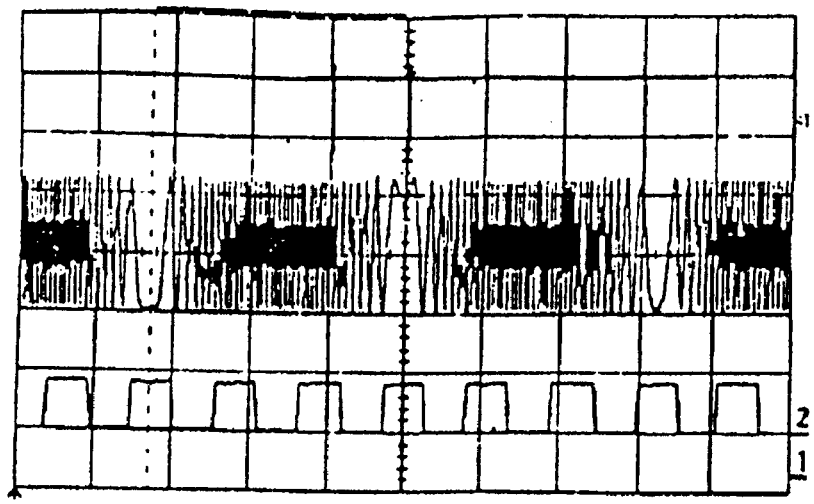

FIG. 5(A) shows the in-track-following error signal when the invention is implemented to a disk player.

Figure 5B:
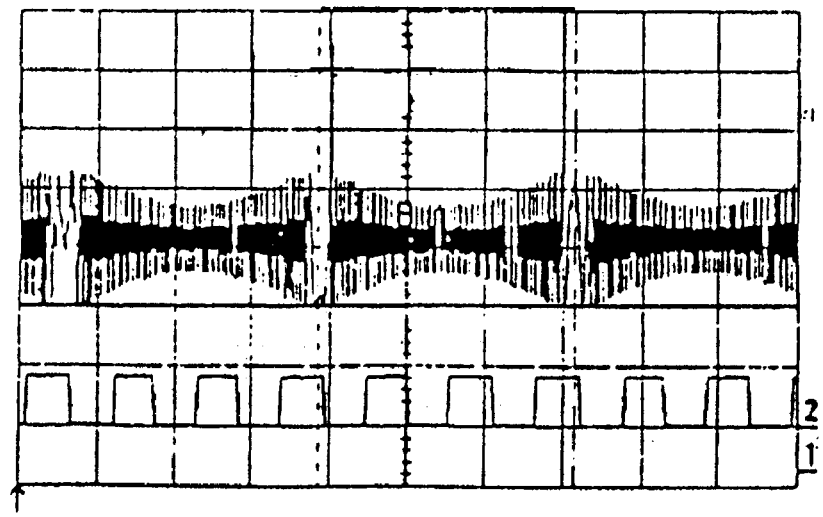

FIG. 5(B) shows the deterioration of the in-track-following error signal in connection with a prior art disk player.

Figure 6:
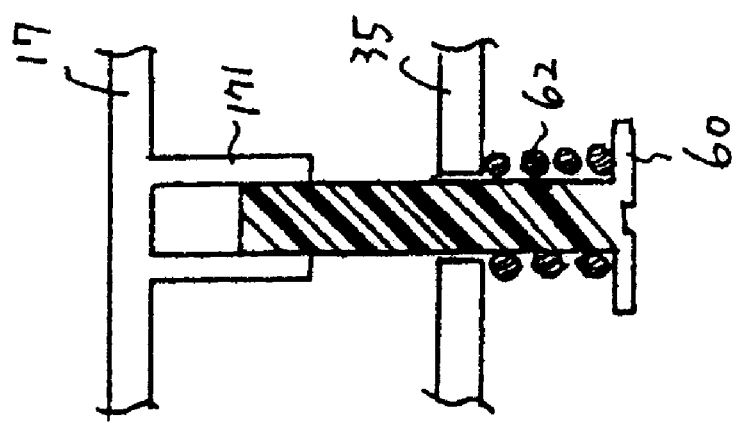

FIG. 6 shows one embodiment implemented to connect the micro-adjustment apparatus with the framework 17.

Figure 7:
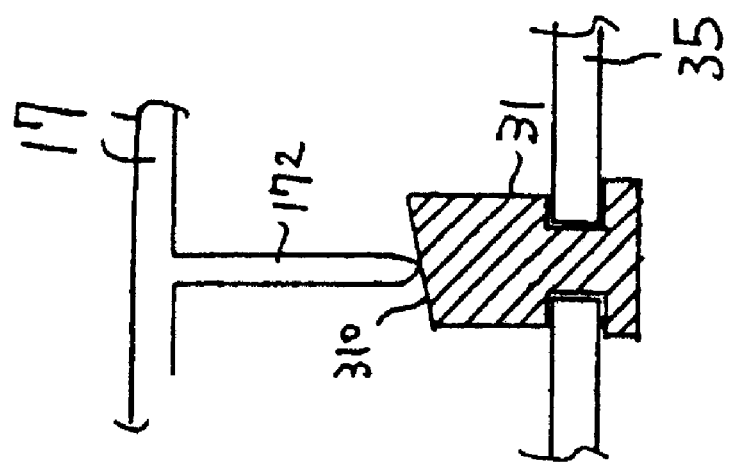

FIG. 7 discloses the relationship of the first adjustable pivotal device 31 with respect to the framework 17.

DETAILED DESCRIPTIONS OF THE PREFERRED EMBODIMENT

Figure 1:
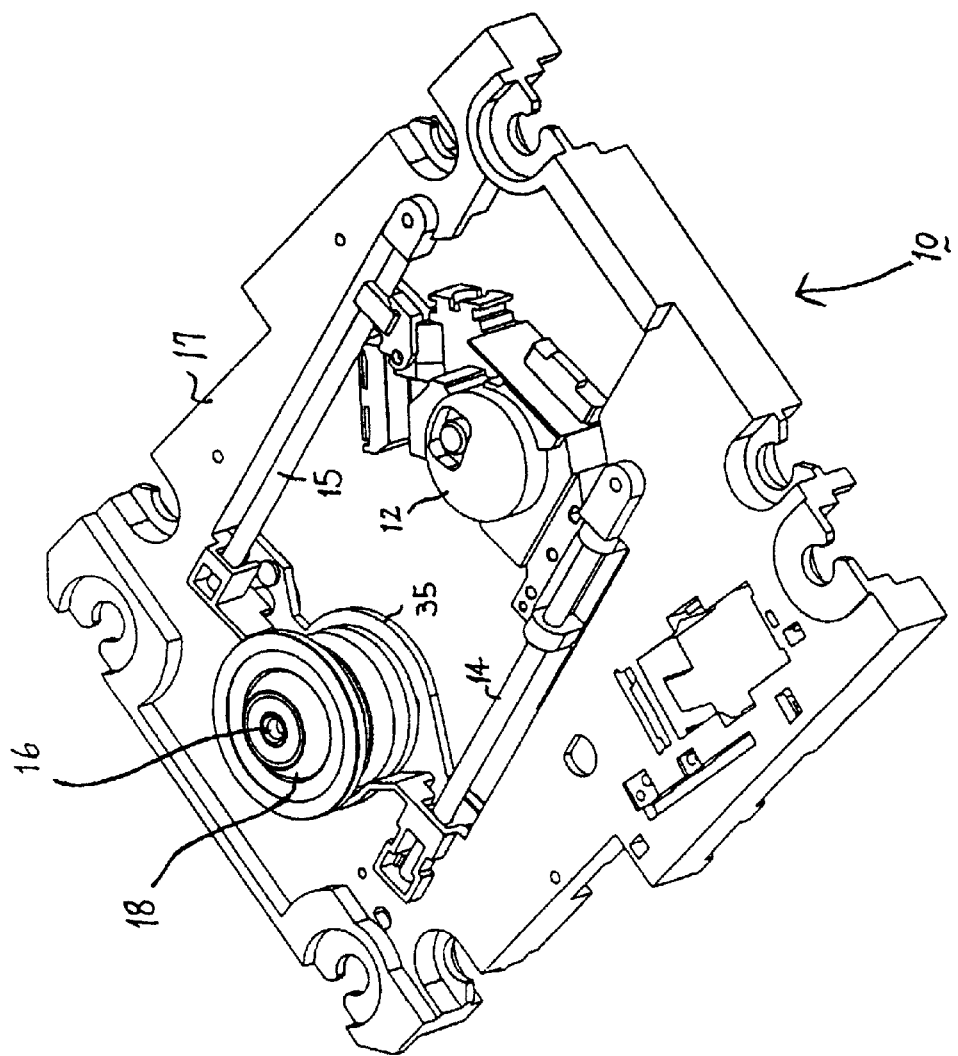
Figure 2:
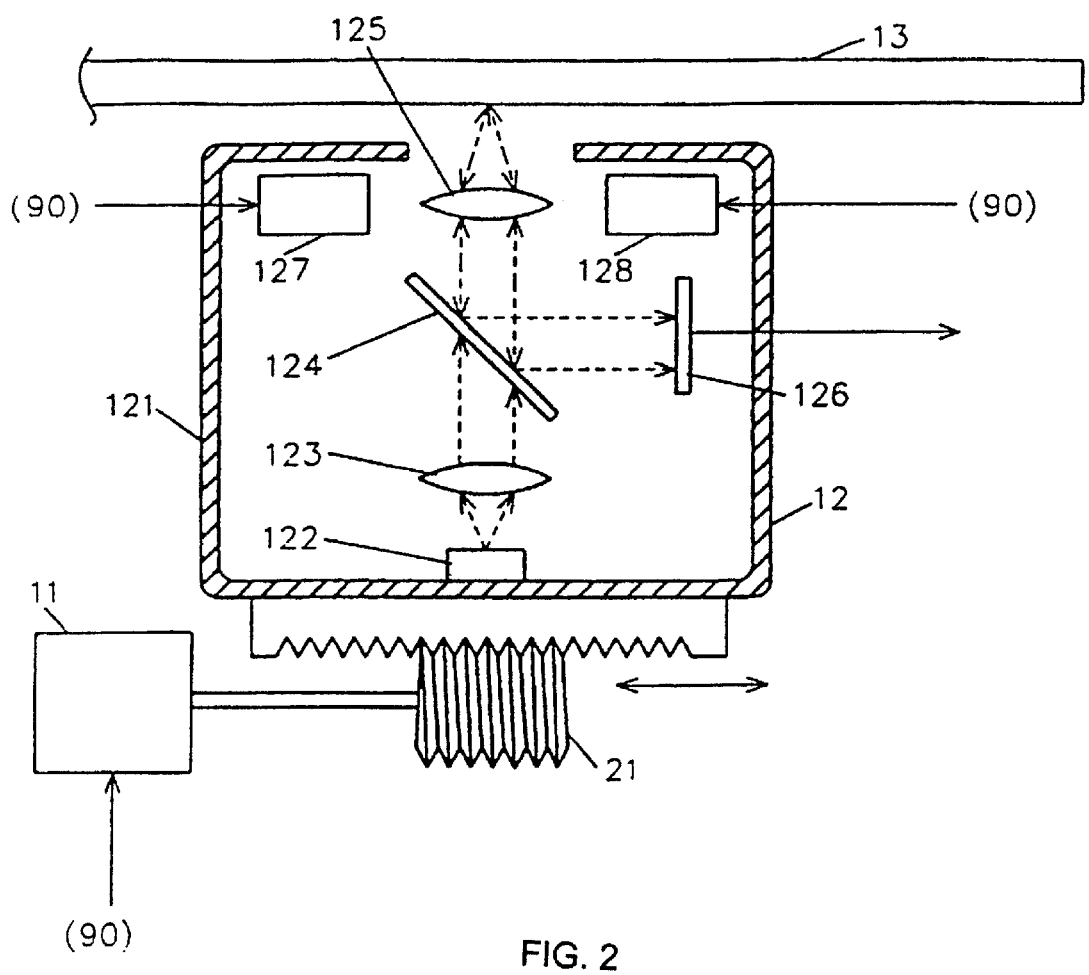
FIG. 2 shows the internal structure of a typical pickup.
Figure 3:
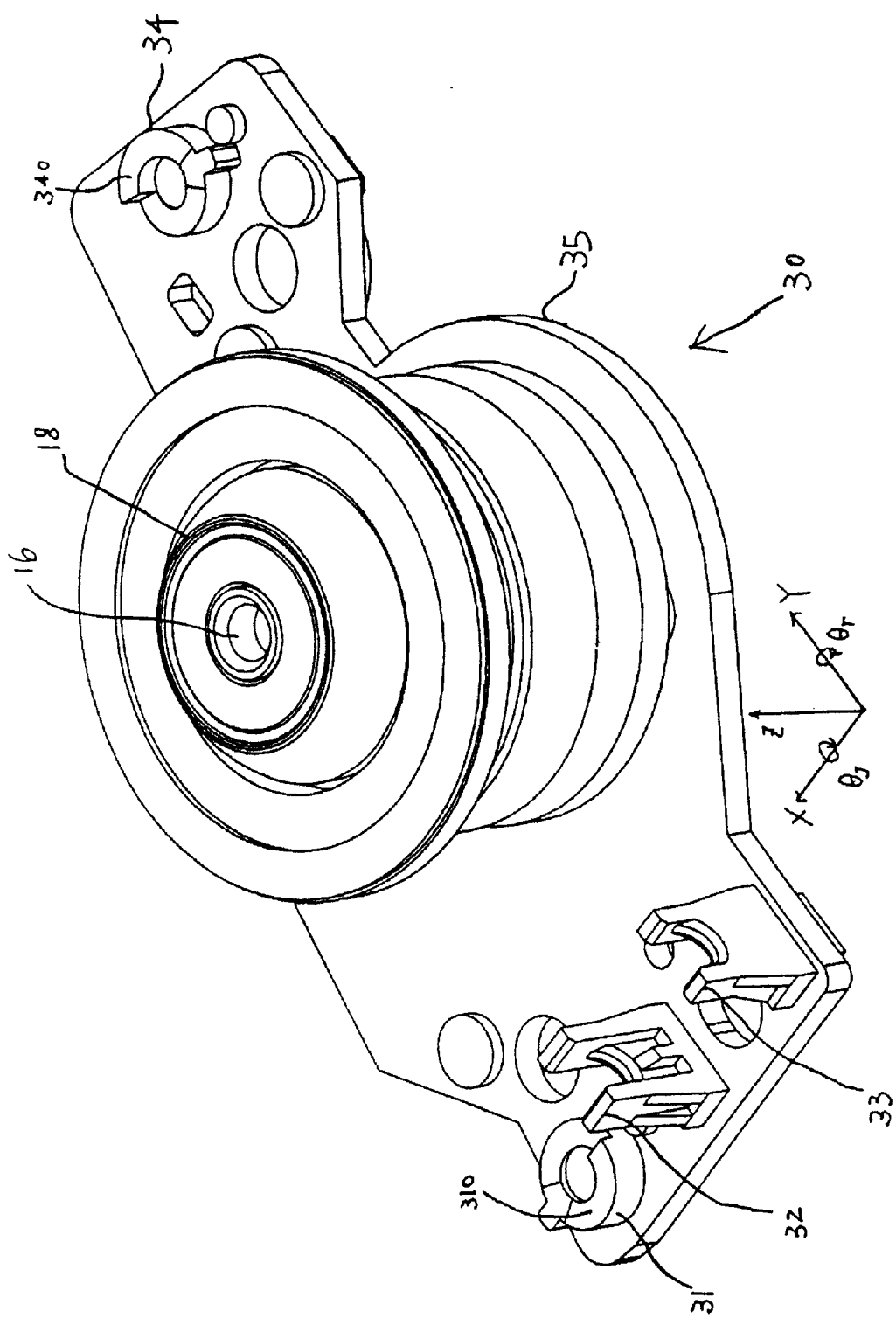
FIG. 3 shows the micro-adjustment apparatus of the invention.

As shown in FIG. 1 and FIG. 3, the optical disk player of the invention includes a micro-adjustment apparatus 30 for the adjustment of spindle motor installation angle. The optical disk player includes a traverse 10 which drives the pickup. The traverse 10 includes a pickup 12, a framework 17, and the pickup 12 includes a light source for supplying light beam. The traverse 10 includes a first guide rail 14 for guiding and supporting the pickup 12 to perform data reproduction over different data track. As the spindle 16 is spinning, a spin surface is defined. The micro-adjustment apparatus 30 is disposed under the framework 17 and coupled to the framework 17 with capability of adjusting the vertical spacing between the framework 17 and the micro-adjustment apparatus 30.

As shown in FIG. 3, the micro-adjustment apparatus 30 includes a supporting plate 35, a pivotal device 33, a first adjustable pivotal device 31, and a second adjustable pivotal device 34.

The supporting plate 35 functions to carry the spindle motor. The supporting plate 35 connects with the framework 17 with capability of adjusting the vertical spacing between the framework 17 and the supporting plate 35. The connection device may be a screw and a corresponding bore provided on the bottom portion of the framework 17. The corresponding bore may be a female screw. FIG. 6 shows one embodiment implemented to connect the micro-adjustment apparatus with the framework 17. The supporting plate 35 in FIG. 3 includes three holes, and the screw 60 shown in FIG. 6 passes the corresponding hole upwardly, and the screw 60 connects to the corresponding female screw 171 on the bottom of framework 17. As shown in FIG. 6, a spring 62 is sleeved into the screw 60 with one end of the spring 62 touching against the bottom of the supporting plate 35 and the other end of spring 62 touching against the head of the screw 60. Due to the spring force of the spring 62, the vertical spacing between the supporting plate 35 and the framework 17 is adjustable. The adjustment operation is effected by the first adjustable pivotal device 31 or the second adjustable pivotal device 34.

The pivotal device 33, used as a reference point during micro-adjustment operation, is located at a first predetermined location of the supporting plate 35 and contacts with the first guide rail 14 (not shown in FIG. 3). In other words, during micro-adjustment, the axis of the first guide rail 14 imposes a constraint to the inclined angle or elevation angle variation of the supporting plate 35. One preferred embodiment of pivotal device 33 is shown in FIG. 3. The pivotal device 33 includes a support, and the support includes an arch edge contacting with the surface of the first guide rail 14 at a reference point in the vertical direction. Two ends of the arch edge respectively extend upwardly to contact the shaft surface of the first guide rail 14 at a reference point in the horizontal direction.

The first adjustable pivotal device 31 is located at a second predetermined location of the supporting plate 35 for adjusting elevation angle ($\theta_r$) of the supporting plate 35 with respect to the optical pickup surface such that the light beam is substantially vertical to the spin surface. As it is, the elevation angle is zero. The imaginary line connecting the first adjustable pivotal device 31 and the pivotal device 33 parallels with the first guide rail 14. The first adjustable pivotal device 31 and the pivotal device 33 together constitute the micro-adjustment mechanism for the elevation angle of supporting plate 35. One preferred embodiment of the first adjustable pivotal device 31 is a cam-type device, which is rotatable and non-displaceable during operation. As shown in FIG. 3, the top portion of the cam-type device includes a section of inclined surface 310. The cam-type device is press fitted into a corresponding through-hole on the supporting plate 35 by a well-known injection mold operation. A tool, e.g. the screw driver, may drive and rotate the cam-type device such that one point on the inclined surface 310 touches against a corresponding protrusion 172 extending from the lower surface of the framework 17, as shown in FIG. 7. As the actual contact point is adjusted to be close to the upper limit end of the inclined surface 310, the vertical spacing between the supporting plate 35 and the lower surface of the framework 17 is larger. On the contrary, as the actual contact point is adjusted to be close to the lower limit end of the inclined surface 310, the vertical spacing between the supporting plate 35 and the lower surface of the framework 17 is smaller. In other words, rotation of the cam-type device can adjust the elevation angle $\theta_r$ of the supporting plate 35 with respect to the optical pickup surface.

The second adjustable pivotal device 34 is located at a third predetermined location of the supporting plate 35 for adjusting incline angle ($\theta_j$) of the supporting plate 35 with respect to the optical pickup surface such that the light beam is substantially vertical to the spin surface. As it is, the incline angle is zero. The imaginary line connecting the second adjustable pivotal device 34 and the pivotal device 33 is vertical to the first guide rail 14. The second adjustable pivotal device 34 and the pivotal device 33 together constitute the micro-adjustment mechanism for the incline angle of supporting plate 35. One preferred embodiment of the second adjustable pivotal device 34 is a cam-type device, which is rotatable and non-displaceable during operation. As shown in FIG. 3, the top portion of the cam-type device includes a section of inclined surface 340. The cam-type device is press fitted into a corresponding through-hole on the supporting plate 35 by an well known injection mold operation. A tool, e.g. the screw driver, may drive and rotate the cam-type device such that one point on the inclined surface 340 touches against a corresponding protrusion extending from the lower surface of the framework 17. As the actual contact point is adjusted to be close to the upper limit end of the inclined surface 340, the vertical spacing between the supporting plate 35 and the lower surface of the framework 17 is larger. On the contrary, as the actual contact point is adjusted to be close to the lower limit end of the inclined surface 340, the vertical spacing between the supporting plate 35 and the lower surface of the framework 17 is smaller. In other words, rotation of the cam-type device can adjust the elevation angle $\theta_j$ of the supporting plate 35 with respect to the optical pickup surface.

A first surface (plane) is defined as that on which the spindle 6 makes rotation, and a second surface (plane) is defined as the pickup 12 performs the data reproduction operation along which the pickup 12 moves during data reproduction. It is noted that the first surface is also known as the spin surface and the second surface is also known as the optical pickup surface. By provision of the micro-adjustment apparatus of the invention, the first surface can be adjusted to be substantially parallel to the second surface.

In addition, the micro-adjustment apparatus 30 further includes an auxiliary pivotal device 32 located at a fourth predetermined location of the supporting plate 35 for preventing lateral movement of the supporting plate 35 when it is being assembled to the framework 17. One preferred embodiment of the auxiliary pivotal device 32 is shown in FIG. 3. The pivotal device includes a support, and the support includes an arch edge which does not contact with the surface of the first guide rail 14 in the vertical direction. Two ends of the arch edge respectively extend upwardly to contact with the surface of the first guide rail 14 in the horizontal direction. The pivotal device 33 cooperates with the auxiliary pivotal device 32 to prevent misalignment of the supporting plate 35 during assembly to the framework 17. The height of arch edge of auxiliary pivotal device 32 is lower than that of arch edge of the pivotal device 33. This arrangement prevents the contact of the arch edge of auxiliary pivotal device 32 with the surface of the first guide rail 14 in the vertical direction during elevation angle micro-adjustment.

In FIG. 4(A), the status in which incline angle micro-adjustment by the second adjustable pivotal device 34 is not yet performed to the invention is shown. As a calibration disk is loaded into the disk player to make read/write test and the test result falls outside of a reference range, it indicates a micro-adjustment needs to be done through the second adjustable pivotal device 34. However, if the test result falls within the reference range, no micro-adjustment through the second adjustable pivotal device 34 needs to be done and the status shown in FIG. 4(A) is maintained. During the micro-adjustment operation through the second adjustable pivotal device 34 and as the test result, obtained under the status shown in FIG. 4(B), falls within the reference range, the status in FIG. 4(B) is regarded as the final status of the invention as the incline angle micro-adjustment is concerned. The elevation angle micro-adjustment works similarly.

From FIG. 4(A) and FIG. 4(B), it is noted that, during micro-adjustment, the distance L between disk spin center and the projection point of the first guide rail 14 over the surface of the disk 13 is kept constant. Regardless of which track of the disk the pickup 12 is moving along, the invention guarantees the moving trace of the lens within the pickup 12 passes through the center of the spindle 16. Therefore, the invention results in an in-track-following error signal shown in FIG. 5(A) and prevents the happening of the in-track-following error signal shown in FIG. 5(B).

What is claimed is:

1. A spindle motor installation angle micro-adjustment apparatus in an optical disk player, the optical disk player including a traverse, the traverse including a spindle for spinning an optical disc, a pickup, a first guide rail and a framework, the pickup including a light source for supplying a light beam, the first guide rail guiding the pickup along a pickup plane during data reproduction, a spin surface of the optical disc being defined while the spindle is spinning, the micro-adjustment apparatus comprising:

a supporting plate for supporting said spindle motor, the supporting plate being adjustably coupled to the framework;

a pivotal means disposed at a first predetermined location on the supporting plate, the pivotal means contacting with a surface of said first guide rail;

a first adjustable pivotal means, disposed at a second predetermined location on the supporting plate, for adjusting an elevation angle of the supporting plate with respect to the pickup plane;

a second adjustable pivotal means, disposed at a third predetermined location on the supporting plate, for adjusting an incline angle of the supporting plate with respect to the pickup plane, wherein when said first adjustable pivotal means is adjusted, the supporting plate is tilted in an x-direction, and when said second adjustable pivotal means is adjusted, the supporting plate is tilted in a y-direction, the y-direction being in a different direction than the x-direction.

2. The micro-adjustment apparatus of claim 1, further comprising an auxiliary pivotal means disposed at a fourth predetermined location of the supporting plate for preventing lateral movement of the supporting plate with respect to the traverse.

3. The micro-adjustment apparatus of claim 2, wherein the auxiliary pivotal means is a support, the support an arch edge, two ends of said arch edge respectively extending upwardly to contact with the shaft surface of said first guide rail, the auxiliary pivotal means and the pivotal means together preventing lateral movement of the supporting plate.

4. The micro-adjustment apparatus of claim 1, wherein said pivotal means includes a support, the support including an arch edge contacting with the surface of said first guide rail at a reference point in the vertical direction, two ends of said arch edge respectively extending upwardly to contact with the surface of said first guide rail at a reference point in the horizontal direction.

5. The micro-adjustment apparatus of claim 4, wherein the first adjustable pivotal means is a cam-type device, a section of an inclined surface being provided on a top portion of the cam-type device, the cam-type device being press fitted into a corresponding through-hole on the supporting plate by an injection mold operation.

6. The micro-adjustment apparatus of claim 5, wherein the second adjustable pivotal means is a cam-type device, a section of an inclined surface being provided on a top portion of the cam-type device, the cam-type device being press fitted into a corresponding through-hole on the supporting plate by an injection mold operation.

7. The micro-adjustment apparatus of claim 1, wherein a distance between a projection line extending through said pivotal means, and an axis of the spindle remains constant during the adjustment of said first adjustable pivotal means and during the adjustment of said second adjustable pivotal means.

8. An optical disk player, comprising:

a traverse, the traverse including a spindle for spinning an optical disk, a pickup, a first guide rail and a framework, the pickup including a light source for supplying a light beam, the first guide rail guiding the pickup during data reproduction, a first plane being defined by a surface of the optical disk while the spindle is spinning, a second plane being defined by movement of the pickup during data reproduction;

a spindle motor for driving the spindle, said spindle driving a turntable and the disk thereon; and a micro-adjustment apparatus for adjusting a tilt of said spindle so that the first plane is substantially parallel to the second plane.

9. The optical disk player of claim 8, wherein the micro-adjustment apparatus comprises:

a supporting plate for supporting said spindle motor, the supporting plate being adjustably coupled to the framework;

a pivotal means disposed at a first predetermined location on the supporting plate, the pivotal means contacting with a surface of said first guide rail;

a first adjustable pivotal means, disposed at a second predetermined location on the supporting plate, for adjusting an elevation angle of the supporting plate with respect to the second plane;

a second adjustable pivotal means, disposed at a third predetermined location on the supporting plate, for adjusting an incline angle of the supporting plate with respect to the second plane, wherein when said first adjustable pivotal means is adjusted, the supporting plate is tilted in an x-direction, and when said second adjustable pivotal means is adjusted, the supporting plate is tilted in a y-direction, the y-direction being in a different direction than the x-direction.

10. The optical disk player of claim 9, further comprising an auxiliary pivotal means disposed at a fourth predetermined location of the supporting plate for preventing lateral movement of the supporting plate.

11. The optical disk player of claim 10, wherein the auxiliary pivotal means is a support, the support including an arch edge, two ends of said arch edge respectively extending upwardly to contact with the surface of said first guide rail, the auxiliary pivotal means and the pivotal means together preventing lateral movement of the supporting plate.

12. The optical disk player of claim 9, wherein said pivotal means includes a support, the support including an arch edge contacting with the surface of said first guide rail at a reference point in the vertical direction, two ends of said arch edge respectively extending upwardly to contact with the surface of said first guide rail at a reference point in the horizontal direction.

13. The optical disk player of claim 9, wherein the first adjustable pivotal means is a cam-type device, a section of an inclined surface being provided on a top portion of the cam-type device, the cam-type device being press fitted into a corresponding through-hole on the supporting plate by an injection mold operation.

14. The optical disk player of claim 9, wherein the second adjustable pivotal means is a cam-type device, a section of an inclined surface being provided on a top portion of the cam-type device, the cam-type device being press fitted into a corresponding through-hole on the supporting plate by an injection mold operation.

15. The optical disk player of claim 9, wherein a distance between a projection line extending through said pivotal means, and an axis of the spindle remains constant during the adjustment of said first adjustable pivotal means and during the adjustment of said second adjustable pivotal means.

* * * * *